United States Patent [19]

Ebmeyer et al.

[11] Patent Number: 5,739,070
[45] Date of Patent: Apr. 14, 1998

[54] PROCESS FOR REGENERATING A FLUORINATION CATALYST

[75] Inventors: Frank Ebmeyer; Ralf Finzel, both of Hattersheim; Günter Siegemund, Hofheim; Wolfgang Wanzke, Meitingen, all of Germany

[73] Assignee: Solvay (Societe Anonyme), Brussels, Belgium

[21] Appl. No.: 458,361

[22] Filed: Jun. 2, 1995

[30] Foreign Application Priority Data

Jun. 3, 1994 [DE] Germany ............... 44 19 534.6

[51] Int. Cl.$^6$ ............... B01J 38/44; B01J 38/46
[52] U.S. Cl. ............... 502/37; 502/36; 502/38
[58] Field of Search ............... 502/36, 37, 38

[56] References Cited

U.S. PATENT DOCUMENTS

| | | | |
|---|---|---|---|
| 3,884,834 | 5/1975 | Eberly et al. | 252/439 |
| 4,547,483 | 10/1985 | Müller et al. | 502/226 |
| 5,227,350 | 7/1993 | Scott et al. | 502/36 |
| 5,407,877 | 4/1995 | Scott | 502/36 |

FOREIGN PATENT DOCUMENTS

| | | |
|---|---|---|
| 0 475 693 | 3/1992 | European Pat. Off. . |
| 93/10898 | 6/1993 | WIPO . |

*Primary Examiner*—Glenn Caldarola
*Assistant Examiner*—Alexander G. Ghyka
*Attorney, Agent, or Firm*—Connolly & Hutz

[57] ABSTRACT

Process for regenerating a fluorination catalyst The invention relates to a process for regenerating a fluorination catalyst containing chromium and magnesium after use in a fluorination reaction, in which the used catalyst is treated with a mixture comprising at least 10 mol % of HF, from 30 to 90 mol % of $O_2$ and from 0 to 60 mol % of inert gas.

20 Claims, No Drawings

PROCESS FOR REGENERATING A FLUORINATION CATALYST

The invention relates to a process for regenerating a fluorination catalyst containing chromium and magnesium.

Fluorine-containing hydrocarbon halides are used, for example as refrigerants or as solvents for foaming. Recently, the chlorine-containing CFCs have been held responsible for the destruction of the ozone layer in the stratosphere, so that the use of CFCs has been greatly restricted, internationally too.

For this reason, chlorine-free hydrogen-containing fluoroalkanes (HFCs), which have no potential for degrading ozone and are degraded even in the troposphere, are seen as alternatives.

Hydrogen-containing fluoroalkanes (HFCs), such as 1,1,1,2-tetrafluoroethane (HFC 134a), are prepared by heterogeneously catalyzed gas-phase reactions over fixed-bed catalysts based on chromium. A large number of these chromium-containing fluorination catalysts are described in the literature. Although these catalysts show a good initial activity, they lose activity over a prolonged reaction time, which is a problem for their industrial usability. Various methods have therefore already been described for regenerating such catalysts.

According to Chemical Abstracts 112(14):121102z or U.S. Pat. No. 2,745,886, chromium-containing fluorination catalysts are regenerated by means of oxygen (from 1 to 30% by volume) in a separate operating phase. Subsequently, the catalyst has to be further treated with HF before it can be used again.

EP-A-0 475 693 describes regeneration using a mixture of an oxidant, preferably air, and HF, with the proportion of the oxidant being at most 30 mol %. Further treatment with HF is not necessary. A disadvantage of this process is the relatively low proportion of the oxidant, in particular air, which is the maximum permitted (30 mol %) to restore the activity of the chromium catalysts. A higher proportion of the oxidant would apparently lead to an undesired strongly exothermic reaction and to loss of chromium from the catalyst. Owing to this relatively low tolerable proportion of the oxidant, the regenerations of the catalyst which are required at regular intervals take a relatively long time, which means undesirably long interruptions in the fluorination reaction to be carried out using the catalyst.

Surprisingly, it has now been found that magnesium-containing chromium catalysts, in particular the chromium-magnesite catalyst described in U.S. Pat. No. 4,547,483, can be regenerated very well using a mixture of $O_2$ and HF containing from 30 to 90 mol % of oxygen. Owing to the high oxygen content of the mixture, the regeneration proceeds very quickly. Subsequently, the catalyst is immediately ready to use again; further treatment with HF is not necessary. The catalyst is unavailable for use in fluorination reactions for only a short time. Even with a content of from 10 to 30 mol % of oxygen in the $HF/O_2$ mixture, regeneration can be carried out without difficulty but takes longer than with a content of from 30 to 90 mol %.

The invention provides a process for regenerating a fluorination catalyst containing chromium and magnesium after use in a fluorination reaction, which comprises treating the used catalyst at a temperature of from 200 to 500° C. with a mixture comprising at least 10 mol % of HF, from 30 to 90 mol % of $O_2$ and from 0 to 60 mol % of inert gas.

Suitable "inert gases" are all gases which are inert under the regeneration conditions, such as $N_2$, noble gases or $CO_2$, especially $N_2$.

The mixture used for regeneration can also be prepared from corresponding proportions of HF, $O_2$ and air.

The mixture used for regeneration preferably comprises at least 10 mol % of HF, from 40 to 70 mol % of $O_2$ and from 0 to 60 mol % of inert gas. Particularly suitable are mixtures which contain no inert gas, in particular those comprising from 50 to 60 mol % of HF and from 50 to 40 mol % of $O_2$.

The regeneration is generally carried out at from 200 to 500° C., preferably from 300 to 450° C., in particular from 350 to 450° C.

The (absolute) pressure is generally from 1 to 20 bar, preferably from 2 to 10 bar.

The fluorination catalyst containing chromium and magnesium generally contains from 10 to 40% by weight of Mg, preferably from 15 to 35% by weight, in particular from 20 to 30% by weight. The Cr content is generally 10% by weight, in particular from 3 to 6% by weight. The remainder is anions of the Mg and Cr compounds used, and also, if desired, materials such as graphite or activated carbon with which these compounds can be mixed.

In general, anhydrous or hydrated compounds of trivalent chromium are used, e.g. the sulfate, fluoride, nitrate or chloride, preferably the nitrate or chloride. The magnesium compounds used are generally the oxide or hydroxide. A particularly suitable catalyst is the chromium-magnesite catalyst described in U.S. Pat. No. 4,547,483.

The following examples illustrate the invention.

Use was here made of a fluorination catalyst containing chromium and magnesium-which had been prepared according to U.S. Pat. No. 4,547,483, Example 1, and is hereinafter described as "chromium-magnesite catalyst".

EXAMPLE 1

500 ml of the chromium-magnesite catalyst according to U.S. Pat. No. 4,547,483 were placed in a tube of nickel or VA steel having an internal diameter of 5 cm and a length of 100 cm. The catalyst was heated to 380° C. 80 g/h of 2-chloro-1,1,1-trifluoroethane (R133a) and 40 g/h of hydrogen fluoride (molar ratio 1:3) in the gaseous state were subsequently passed over the catalyst. The gaseous reaction products leaving the reactor were passed into a scrubbing reservoir filled with water, in which reservoir the hydrogen chloride formed and excess hydrogen fluoride were absorbed. The gaseous, water-insoluble reaction products were analyzed by gas chromatography. The yield of R134a dropped from 18.2% to 13.9% over a period of 43 hours. The 2-chloro-1,1,1-trifluoroethane feed was turned off. After 30 minutes, the hydrogen fluoride feed was reduced to 20 g/h (1 mol/h) and 15 l/h (0.67 mol/h) of oxygen were added. This corresponded to a molar ratio of hydrogen fluoride to oxygen of 3:2, i.e. 60 mol % of HF and 40 mol % of $O_2$. The temperature in the reactor tube first rose to 405° C. and then fell again. After it had returned to 380° C. after 3 hours, the oxygen feed was stopped. The regenerated catalyst was then reused for fluorination, by passing hydrogen fluoride (40 g/h) together with 2-chloro-1,1,1-trifluoroethane (80 g/h) over it. After a reaction time of the regenerated catalyst of 2 hours, analysis by gas chromatography indicated a yield of R134a of 18.3%.

EXAMPLE 2

500 ml of the chromium-magnesite catalyst were placed in the experimental arrangement described in Example 1 and were heated to 360° C. 60 g/h of 2-chloro-1,1,1-trifluoroethane (R133a) and 60 g/h of hydrogen fluoride were passed in gaseous format a pressure of 10 bar (absolute) over the catalyst (molar ratio hydrogen fluoride: R133a=5.9:1). The yield of R134a was 25.6% at the beginning of the reaction and during the course of the reaction dropped to 23.4% over a period of 94 hours. To regenerate the catalyst, the 2-chloro-1,1,1-trifluoroethane feed was turned off and the pressure was reduced to 2 bar (absolute). After 25 minutes, the hydrogen fluoride feed was throttled back to 35 g/h and oxygen was added in an amount of 40 1/h (molar ratio hydrogen fluoride:oxygen=1:1, i.e. 50 mol % of HF and 50 mol % of $O_2$). The catalyst temperature first rose over a period of 0.5 hour to 405° C. and then fell again over a period of 4 hours to the initial value of 360° C. These reaction phases were carried out four times, with a regeneration phase being carried out after each of the reaction phases 1, 2 and 3. The yields are shown in Table 1.

TABLE 1

| Reaction phase | Initial yield R134a [%] | Final yield R134a [%] | Running time [h] |
| --- | --- | --- | --- |
| 1 | 25.6 | 23.4 | 94 |
| 2 | 25.3 | 23.5 | 96 |
| 3 | 25.6 | 23.2 | 90 |
| 4 | 25.7 | 23.2 | 92 |

EXAMPLE 3

1000 ml of the chromium-magnesite catalyst were placed in the experimental arrangement described in Example 1 and were heated to 420° C. 120 g/h of 2-chloro-1,1,1-trifluoroethane (R133a) and 120 g/h of hydrogen fluoride were passed in gaseous form over the catalyst (molar ratio hydrogen fluoride: R133a=5.9:1). After 5 hours, the yield of R134a was 27.9%. After a further 72 hours, the yield of R134a was found to be 24.1%. The 2-chloro-1,1,1-trifluoroethane feed was then turned off. After 30 minutes, the hydrogen fluoride feed was reduced to 27 g/h and 20 1/h of oxygen were added (molar ratio hydrogen fluoride: oxygen=3:2, i.e. 60 mol % of HF and 40 mol % of $O_2$. The temperature in the catalyst first rose from 420° C. to 450° C. and then fell over a period of 3 hours to the initial value of 420° C. The oxygen feed was then turned off and the feed of hydrogen fluoride and 2-chloro-1,1,1-trifluoroethane were set to the initial values. After a further 5 hours, the yield of R134a was found to be 28.2%.

EXAMPLE 4

1000 ml of the chromium-magnesite catalyst were placed in the experimental arrangement described in Example 1 and were heated to 320° C. 80 g/h of 2-chloro-1,1,1-trifluoroethane (R133a) and 120 g/h of hydrogen fluoride were then passed in gaseous form over the catalyst (molar ratio hydrogen fluoride: 2-chloro-1,1,1-trifluoroethane= 8.9:1). After 8 hours, the yield of R134a was 20.4%. After a further 73 hours, the yield of R134a was found to be 16.8%. The 2-chloro-1,1,1-trifluoroethane feed was then turned off. After 30 minutes, the hydrogen fluoride feed was reduced to 36 g/h and 40 1/h of oxygen were added (molar ratio hydrogen fluoride: oxygen=1:1, i.e. 50 mol % of HF and 50 mol % of $O_2$). The temperature in the catalyst first rose from 320° C. to 360° C. and then fell over a period of 2.5 hours to the initial value of 320° C. The oxygen feed was then turned off. After 20 minutes, the feed of hydrogen fluoride and 2-chloro-1,1,1-trifluoroethane were set to the initial values. After a further 3 hours, the yield of R134a was found to be 20.2%.

We claim:

1. A process for regenerating a fluorination catalyst containing chromium and magnesium after use in a fluorination reaction, which comprises treating the used catalyst at a temperature of from 200° to 500° C. with a mixture consisting of at least 10 mol % of HF, from 30 to 90 tool % of $O_2$ and from 0 to 60 mol % of inert gas.

2. The process as claimed in claim 1, wherein the oxygen content of the mixture is from 40 to 70 mol %.

3. The process as claimed in claim 1, wherein the mixture consists of from 50 to 60 mol % of HF and from 50 to 40 mol % of $O_2$ and is free of inert gas.

4. The process as claimed in claim 1, carried out at a temperature of from 300° to 450° C.

5. A process for regenerating a fluorination catalyst containing chromium and 10 to 40% by weight of magnesium after use in a fluorination reaction, which comprises treating the used catalyst at a temperature of from 200° to 500° C. with a mixture consisting of at least 10 mol % of HF, from 30 to 90 mol % of $O_2$ and from 0 to 60 % of inert gas.

6. The process as claimed in claim 5, wherein the oxygen content of the mixture is from 40 to 70 mol %.

7. The process as claimed in claim 5, wherein the mixture consists of from 50 to 60 mol % of HF and from 50 to 40 mol % of $O_2$ and is free of inert gas.

8. The process as claimed in claim 5, carried out at a temperature of from 300° to 450° C.

9. The process as claimed in claim 6, wherein the catalysts contains from 15 to 35% by weight of magnesium.

10. The process as claimed in claim 7, wherein the catalyst contains 20 to 30% by weight of magnesium.

11. The process as claimed in claim 9, wherein the chromium content is from 3 to 6% by weight.

12. The process as claimed in claim 11, wherein the chromium content is from 3 to 6% by weight.

13. A process for regenerating a fluorination catalyst containing chromium and magnesium after use in a fluorination reaction, which comprises treating the used catalyst at a temperature of from 200° to 500° C. with a mixture comprising at least 50 mol % of HF, at least 30 mol % $O_2$ and optionally an inert gas.

14. The process as claimed in claim 13, wherein the oxygen content of the mixture is at least 40 mol %.

15. The process as claimed in claim 13, wherein the mixture comprises from 50 to 60 mol % of HF and from 50 to 40 mol % of $O_2$ and is free of inert gas.

16. The process as claimed in claim 13, carried out at a temperature of from 300° to 450° C.

17. The process as claimed in claim 13, wherein the catalysts contains from 15 to 35% by weight of magnesium.

18. The process as claimed in claim 3, wherein the catalyst contains 20 to 30% by weight of magnesium and the chromium content is from 3 to 6% by weight.

19. The process as claimed in claim 13, wherein the catalyst contains from 15 to 35% by weight of magnesium.

20. The process as claimed in claim 13, wherein the catalyst contains 20 to 30% by weight of magnesium and the chromium content is from 3 to 6% by weight.

* * * * *